US011790398B2

(12) United States Patent
Soederberg et al.

(10) Patent No.: US 11,790,398 B2
(45) Date of Patent: Oct. 17, 2023

(54) CLASSIFICATION AND PREDICTION OF ONLINE USER BEHAVIOR USING HMM AND LSTM

(71) Applicant: Volvo Car Corporation, Gothenburg (SE)

(72) Inventors: Per Joakim Soederberg, Santa Cruz, CA (US); Olle Ivan Ernevad, Gothenburg (SE); David Håkan Ungerth, Gothenburg (SE); Nils Anders Eickhoff, Gothenburg (SE); Alfred Lars Gillblom Neij, Gothenburg (SE); Joel Olof Rosko, Gothenburg (SE); Isak Peter Waldener, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/664,122

(22) Filed: May 19, 2022

(65) Prior Publication Data

US 2022/0391946 A1 Dec. 8, 2022

Related U.S. Application Data

(60) Provisional application No. 63/193,738, filed on May 27, 2021.

(51) Int. Cl.
G06Q 30/0251 (2023.01)
G06N 5/02 (2023.01)
(52) U.S. Cl.
CPC ........... *G06Q 30/0255* (2013.01); *G06N 5/02* (2013.01)

(58) Field of Classification Search
CPC .............................. G06Q 30/0255; G06N 5/02
See application file for complete search history.

(56) References Cited

U.S. PATENT DOCUMENTS

2007/0214042 A1  9/2007  Dominowska
2009/0164395 A1*  6/2009  Heck ..................... G06F 16/954
                                                    706/16

(Continued)

OTHER PUBLICATIONS

Kaknoya, Viktoriya; "Increasing the Interpretability of Recurrent Neural Networks Using Hidden Markov Models" (Year: 2016).*

(Continued)

*Primary Examiner* — Sam Refai
*Assistant Examiner* — Kyle G Robinson
(74) *Attorney, Agent, or Firm* — Amin, Turocy & Watson, LLP

(57) ABSTRACT

One or more embodiments herein can facilitate a process to guide a user at a digital medium. An exemplary system can comprise a memory that stores computer executable components, and a processor that executes the computer executable components stored in the memory, wherein the computer executable components can comprise an obtaining component that obtains user behavior data from a digital medium, the user behavior data defining an interaction of the user with the digital medium, a prediction component that, based on the user behavior data, predicts a path of the user within the digital medium, and a classification component that, based on the user behavior data and on the path prediction, classifies a position of the user along a defined path to a conversion objective of the digital medium. The conversion objective can comprise obtaining the user as a customer, achieving a financial transaction, or presentation of a communication.

20 Claims, 10 Drawing Sheets

(56) References Cited

U.S. PATENT DOCUMENTS

2011/0302169 A1    12/2011   Brdiczka et al.
2017/0286155 A1    10/2017   Hosabettu et al.
2020/0380183 A1    12/2020   Collins et al.

OTHER PUBLICATIONS

Cabalerro, et al., "Decoding True Website Visitor Intent: MindReader is the next big tool in web analytics". In: Apr. 6, 2021, url: https://datax.berkeley.edu/projects/decoding-true-website-visitor-intent-mindreader-is-the-next-big-tool-in-web-analytics/?fbcli=IwAR3r8GgFLvPE3R1dpp3-gL0Z1x7h7h22WyJyzLwAxg5CG-Mb9ucjFmRfXztY.
Algorithmia, "Introduction to Optimiziers". In: (May 7, 2018). url: https://algorithmia.com/blog/introduction-to-optimizers.
Versloot, "About loss and loss functions". In: (Oct. 4, 2019). url: https://github.com/christianversloot/machine-learning-articles/blob/main/about-loss-and-loss-functions.md#loss-functions.
Volvo Car Corporation, "Privacy Policy". In: (published Mar. 21, 2017). url: https://group.volvocars.com/common-pages/privacy.
Martin, et al., "Hidden Markov Models". In: (Draft of Dec. 29, 2021). url: https://web.stanford.edu/~jurafsky/slp3/A.pdf.
Eddy, "What is a hidden Markov model?" In: Nat Biotechnol 22, 1315-1316 (Oct. 1, 2004). url: https://www.nature.com/articles/nbt1004-1315.
Brownlee, et al., "A Gentle Introduction to Dropout for Regularizing Deep Neural Networks". In: (Dec. 3, 2018). https://machinelearningmastery.com/dropout-for-regularizing-deep-neural-networks/.
Rampurwala, "Classification with TensorFlow and Dense Neural Networks". In: (Feb. 8, 2019) https://heartbeat.comet.ml/classification-with-tensorflow-and-dense-neural-networks-8299327a818a.
Nielsen, "Neural netwoks and deep learning". In: (Dec. 26, 2019). url: http://neuralnetworksanddeeplearning.com/chap1.html.
Phi, "Illustrated guide to LSTM's and GRU's: a step by step explanation". In: (Sep. 24, 2018). url: https://towardsdatascience.com/illustrated-guide-to-lstms-and-gru-s-a-step-by-step-explanation-44e9eb85bf21.
Ruder, "An overview of gradient decent optimization algorithms". In: (Jan. 19, 2016). url: https://ruder.io/optimizing-gradient-descent/index.html#momentum.
Sharma, "Activation function in Neural networks". In: (Sep. 6, 2017). url: https://towardsdatascience.com/activation-functions-neural-networks-1cbd9f8d91d6.
usability.gov, "Web Analytics Basic". In: (Sep. 30, 2020). url: https://www.usability.gov/what-and-why/web-analytics.html.
Koehrsen, "Neural Network Embeddings Explained". In: (Oct. 1, 2018). url: https://towardsdatascience.com/neural-network-embeddings-explained-4d028e6f0526.
Weakliem, "A Critique of the Bayesian Information Criterion for Model Selection". In: Sociological Methods & Research 27.3 (Feb. 1, 1999), pp. 359-397. url: https://journals.sagepub.com/doi/10.1177/0049124199027003002.
mordorintelligence.com, "Web analytics Market". In: (2020). url: https://www.mordorintelligence.com/industry-reports/web-analytics-market.
Van Wel, et al., "Ethical issues in web data mining". In: Ethics and Information Technology 6 (2004), pp. 129-140.
Extended European Search Report received for European Patent Application Serial No. 22174977.3 dated Oct. 19, 2022, 8 pages.
Communication pursuant to Rule 69 EPC received for European Patent Application Serial No. 22174977.3 dated Dec. 5, 2022, 2 pages.

\* cited by examiner

CLASSIFICATION AND PREDICTION OF ONLINE USER BEHAVIOR USING HMM AND LSTM

TECHNICAL FIELD

The subject disclosure relates to prediction systems and methods related user interaction with website interfaces, and more specifically to prediction systems and methods for estimating user use of website interfaces.

BACKGROUND

Digital medium analytics is growing segment of customer relations for all size businesses, which can provide new methods of understanding potential, existing and/or new customers. In some cases, web analytics can replace and/or be employed with conventional surveys. In existing technologies, website interfaces can gather data based on user clicks. Better understanding of user behavior, such as why a user clicks, however, can be desirable.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can facilitate prediction of user behavior for estimating user use of one or more website interfaces. For example, provided can be a prediction system that can predict a next action of a user, determine whether a user will convert, and/or estimate a user's position in a customer journey, such as a purchasing process.

According to an embodiment, a system can comprise a memory that stores computer executable components, and a processor that executes the computer executable components stored in the memory, wherein the computer executable components comprise an obtaining component that obtains user behavior data from a digital medium, the user behavior data defining an interaction of the user with the digital medium, a prediction component that, based on the user behavior data, predicts a path of the user within the digital medium, and a classification component that, based on the user behavior data and on the path prediction, classifies a position of the user along a defined path to a conversion objective of the digital medium.

In one or more embodiments, the conversion objective can comprise obtaining the user as a customer, achieving a financial transaction, or presentation of a communication.

In one or more embodiments, the prediction component further predicts, based on the user behavior data, a probability of whether the conversion objective will be achieved.

According to another embodiment, a computer-implemented method can comprise obtaining, by a system operatively coupled to a processor, user behavior data from a digital medium, the user behavior data defining an interaction of the user with the digital medium, predicting, by the system, based on the user behavior data, a path of the user within the digital medium, and classifying, by the system, based on the user behavior data and on the path prediction, a position of the user along a defined path to a conversion objective of the digital medium.

According to yet another embodiment, a computer program product facilitating a process to guide a user at a digital medium can comprise a non-transitory computer readable storage medium having program instructions embodied therewith, the program instructions executable by a processor to cause the processor to obtain, by the processor, user behavior data from a digital medium, the user behavior data defining an interaction of the user with the digital medium, predict, by the processor, based on the user behavior data, a path of the user within the digital medium, and classify, by the processor, based on the user behavior data and on the path prediction, a position of the user along a defined path to a conversion objective of the digital medium.

An advantage of the device, system, computer-implemented method and/or computer program product discussed above can be employment at a dynamic website interface that can adapt and dynamically provide content based on observation of user use of the website interface. That is, the dynamic website interface can guide a user in a direction, such as in a direction of ownership, purchase, and/or lease.

Another advantage of the device, system, computer-implemented method and/or computer program product discussed above can be a generation of advertisement, campaigns, emails, and/or other communications that can be individualized to a user, based on the observed and predicted behavior of the user.

Yet another advantage of the device, system, computer-implemented method and/or computer program product discussed above can be employment of an artificial intelligence (AI) model, neural network (NN), machine learning (ML) model and/or deep learning (DL) model to predict next actions of a user, to determine next communications and/or website interfaces to provide to the user, and/or to determine a user's position in a customer journey, such as an ownership process, purchasing process, and/or leasing process.

DESCRIPTION OF THE DRAWINGS

One or more exemplary embodiments are described below in the Detailed Description section with reference to the following drawings.

DETAILED DESCRIPTION

Figure 1:
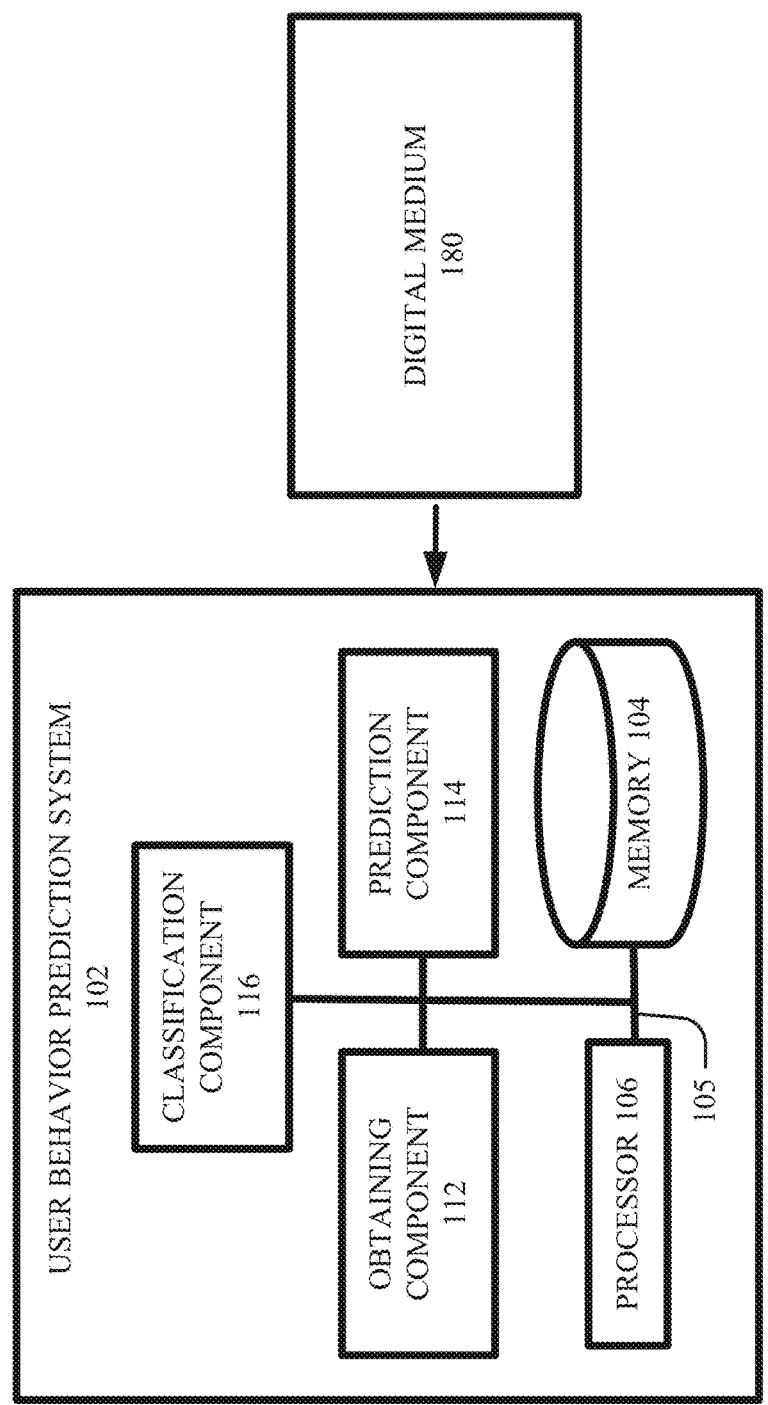
FIG. 1 illustrates a block diagram of an example, non-limiting system that can facilitate guiding user behavior at a digital medium, in accordance with one or more embodiments described herein.

The following detailed description is merely illustrative and is not intended to limit embodiments and/or application or uses of embodiments. Furthermore, there is no intention to be bound by any expressed and/or implied information presented in the preceding Background and/or Summary sections, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, the terms "user", "entity", "requesting entity", and "user entity" can refer to a machine, device, component, hardware, software, smart device and/or human.

As used herein, "data" can comprise metadata.

As used herein, "use" can comprise access to.

As used herein, "cost" can refer to time, money, power, storage, memory, bandwidth, manual labor and/or the like.

In one or more embodiments described herein, systems, devices, computer-implemented methods, and/or computer program products that facilitate modifying electronic control system behavior using distributed and/or federated machine intelligence are described.

Web analytics can be defined as the collecting, reporting, and analyzing of website data. Put another way, web analytics can be defined as analyzing how and why users of a website interface act in one or more certain ways. The information can be obtained and employed towards a goal or an objective, such as to spread information effectively, grow a business, gain customers, increase sales, and/or increase touches.

One or more embodiments defined here are directed to a prediction system to analyze user data from website(s), also herein referred to as website interfaces. Generally, the prediction system can predict a user's next action on a web site interface and whether the user is likely to perform a conversion event, meaning an action which can create value for a business or other owner and/or administrator of the website interface. The prediction system can employ a pair of prediction models comprised by a Long Short-Term Memory (LSTM) model and a classification model generated with a Hidden Markov Model (HMM).

In one or more embodiments, an analytical model, such as an AI model, NN, ML model and/or DN model, can be comprised by and/or employed by each of the LSTM model and the HMM. Generally, an analytical model can be employed for generating predictions, estimations and/or determinations regarding user behavior from data gathered from one or more website interfaces. In one or more embodiments, separate AI models, such as deep neural networks (DNNs) can be employed for each of these processes. By learning and continually updating recognition of user behavior, clicks, patterns, inquiries and/or the like, any one or more of accuracy precision, speed, and/or efficacy of guiding a user in a customer journey can be facilitated. Furthermore, data and/or generated measurements from previous iterations of behavior estimation/prediction can be employed to train the one or more analytical models at any suitable frequency.

The LSTM model can be trained using user data gathered from the one or more website interface to one or more predict next actions of the user and whether the user will convert.

The HMM can determine a website interface sequence based on the user data, and can in turn generate a definition or description of the user's position in the customer journey. The HMM can classify based on a set of defined states. In one or more embodiments, a set of twelve states can be defined and the HMM can be trained on the defined states. Each state can have characteristics that can define a position in a default and/or defined customer journey.

As used herein, the term "customer journey" can refer to a purchasing process, ownership process, leasing process, and/or the like. The customer journey can describe progress of a user, starting with a first click, to becoming a customer (e.g., making a purchase or lease).

For example, a framework described herein can facilitate enabling at least one of the following: personalized web experience; targeted marketing; and/or replacement of subjective surveys. The framework can comprise, without being limited thereto, obtaining user behavior data, formatting the user behavior data, predicting a path of the user at a digital medium, predicting whether a conversion objective will be achieved, and classifying a position of the user along a defined path to the conversion objective.

As referred to above, the one or more frameworks discussed herein are not limited to use by a business relative to a customer journey, but also can be useful for any other goal and/or objective of a business or non-business related website. For example, growth of customers, attracting donations, spreading information, and/or advocacy are but a few goals and/or objectives that can be facilitated via the one or more frameworks discussed herein.

Turning now to the figures, and looking first to FIG. 1, a non-limiting system 100 is illustrated that can comprise one or more devices, systems, and/or apparatuses that can facilitate a process to guide a user at a digital medium, in accordance with one or more embodiments described herein. While referring here to one or more processes, facilitations, and/or uses of the non-limiting system 100, description provided herein, both above and below, also can be relevant to one or more other non-limiting systems described herein, such as the non-limiting system 200, to be described below in detail.

A digital medium can comprise and/or be comprised by an application, software, website, mobile application, and/or the like. A digital medium can comprise a plurality of digital medium interfaces, such as website interfaces. In one or more embodiments, each website interface can define a different page of the website, which can be reached by clicking a link at the website.

The non-limiting system 100 can facilitate both a process to obtain sensor readings and to employ a combination of sensor readings to generate a pose value defining a pose estimation of a vehicle. As illustrated, the non-limiting system 100 can comprise a user behavior prediction system 102 comprising a processor 106, memory 104, bus 105, obtaining component 112, prediction component 114, and classification component 116. Generally, the obtaining component 112 can obtain user behavior data from a digital medium 180, the user behavior data defining an interaction of the user with the digital medium 180. Generally, the prediction component 114 can, based on the user behavior data, predict a path of the user within the digital medium 180. Generally, the classification component 116 can, based on the user behavior data and on the path prediction, classify a position of the user along a defined path to a conversion objective of the digital medium 180.

In one or more alternative embodiments, the digital medium 180 can comprise at least a portion of the user behavior prediction system 102.

One or more aspects of a component (e.g., the obtaining component 112, prediction component 114 and/or classification component 116) can be employed separately and/or in combination, such as employing one or more of the memory 104 or the processor 106. Additionally, and/or alternatively, the processor 106 can execute one or more program instructions to cause the processor 106 to perform one or more operations by these components. The bus 105 can facilitate local communication between the elements of the user behavior prediction system 102.

Figure 2:
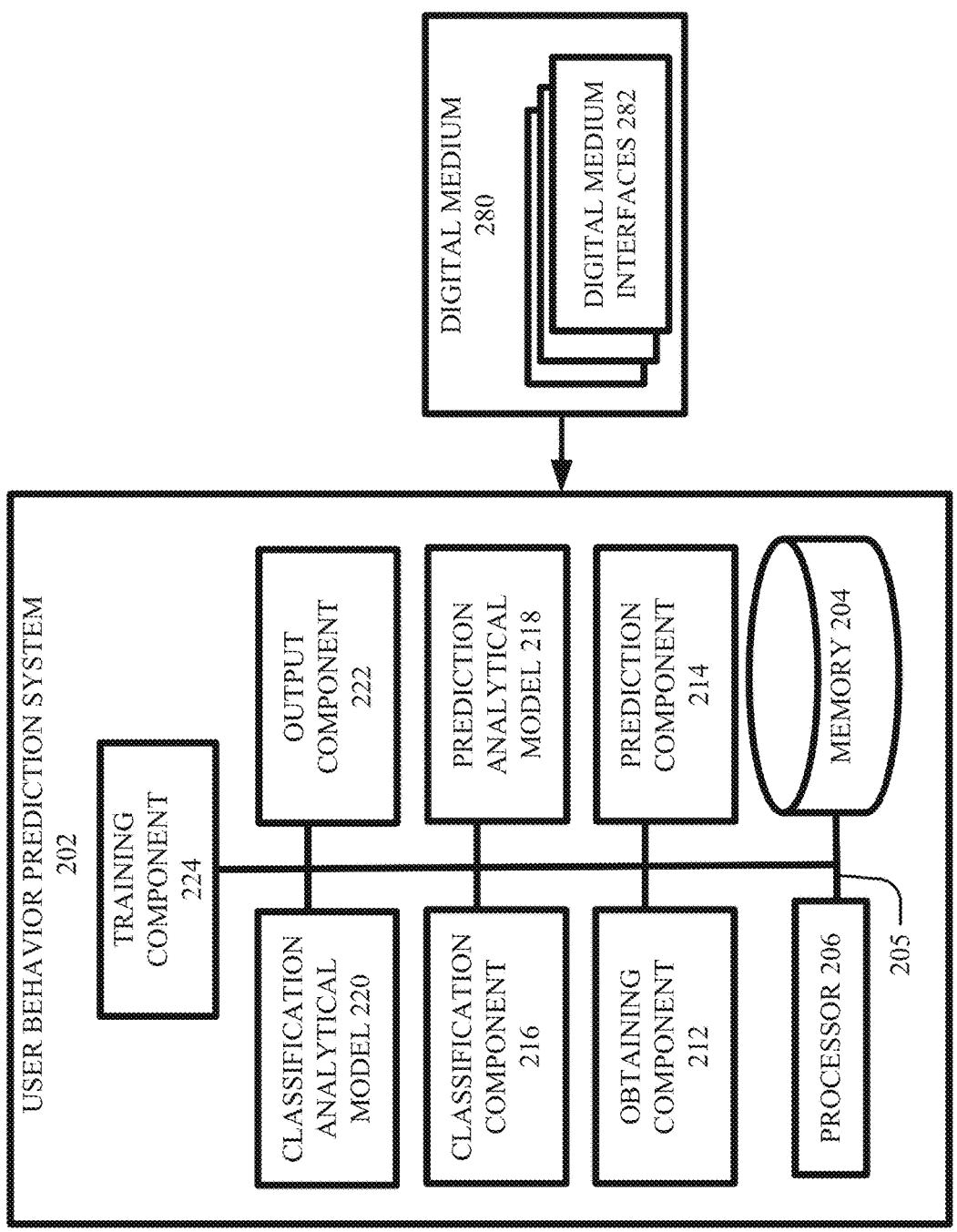
FIG. 2 illustrates another block diagram of an example, non-limiting system that can facilitate guiding user behavior at a digital medium, in accordance with one or more embodiments described herein.

Turning next to FIG. 2, a non-limiting system 200 is depicted. One or more embodiments of the non-limiting system 200 described herein can include one or more devices, systems and/or apparatuses that can facilitate a process to guide user behavior at a digital medium, such as an application or website, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more non-limiting systems or elements of other non-limiting systems described herein, such as the non-limiting system 100.

The non-limiting system 200 can comprise a user behavior prediction system 202 that can facilitate a process to guide user behavior at a digital medium, such as a digital medium 280. The digital medium 280 can comprise and/or be comprised by an application, software, website, mobile application, and/or the like. The digital medium 280 can comprise a plurality of digital medium interfaces 282, such as website interfaces. In one or more embodiments, each website interface can define a different page of the website, which can be reached by clicking a link at the website.

Generally, the user behavior prediction system 202 can facilitate both a process to predict use of the digital medium 280 by the user and to classify the user's path at the digital medium 280, such as relative to a conversion objective of the digital medium 280. For example, a conversion objective can comprise obtaining the user as a customer, achieving a financial transaction, and/or presentation of a communication. A customer can be one that purchases or no purchase can be involved. The financial transaction can be a purchase or lease. The presentation of the communication can be provision of data by the user, provision of an advertisement to the user, provision of a communication to the user, and/or advocation to the user regarding a subject.

Generally, to allow for accurate prediction and classification by the user behavior prediction system 202, the user behavior prediction system 202 can comprise one or more modelling components. For example a prediction component 214 can comprise and/or employ a long short term memory (LSTM) model, and/or a classification component 216 can comprise and/or employ a Hidden Markov Model (HMM). One or more of these models can comprise and/or be employed by an analytical model, such as exhibiting one or more artificial intelligence processes.

The user behavior prediction system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, the user behavior prediction system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the user behavior prediction system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The user behavior prediction system 202 can be associated with, such as accessible via, a cloud computing environment. For example, the user behavior prediction system 202 can be associated with a cloud computing environment 1002 described below with reference to illustration 1000 of FIG. 10.

Operation of the non-limiting system 200 and/or of the user behavior prediction system 202 is not limited to generation of a single predictive or classifying output, but rather can continually output such predictions or classifications, such as dynamically, during use of a digital medium by a user. That is, operation of the non-limiting system 200 and/or of the user behavior prediction system 202 can be scalable. Further, the non-limiting system 200 and/or the user behavior prediction system 202 can facilitate plural process executions of one or more of the above-listed types at least partially in parallel with one another.

In one or more alternative embodiments, the digital medium 280 can comprise at least a portion of the user behavior prediction system 202.

As illustrated the user behavior prediction system 202 can comprise an obtaining component 212, a prediction component 214, a classification component 216, a prediction analytical model 218, a classification analytical model 220, an output component 222, a training component 224, a processor 206, a memory 204, and/or a bus 205.

One or more communications between one or more components of the non-limiting system 200 and/or user behavior prediction system 202 can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 206, memory 204 and bus 205 of the user behavior prediction system 202.

For example, in one or more embodiments, the user behavior prediction system 202 can comprise a processor 206 (e.g., computer processing unit, microprocessor, classical processor, and/or like processor). In one or more embodiments, a component associated with the user behavior prediction system 202, as described herein with or without reference to the one or more figures of the one or more embodiments, can comprise one or more computer and/or machine readable, writable, and/or executable components and/or instructions that can be executed by processor 206 to facilitate performance of one or more processes defined by such component(s) and/or instruction(s). In one or more embodiments, the processor 206 can comprise the obtaining component 212, prediction component 214, classification component 216, prediction analytical model 218, classification analytical model 220, output component 222, and/or training component 224.

In one or more embodiments, the user behavior prediction system 202 can comprise a computer-readable memory 204 that can be operably connected to the processor 206. The memory 204 can store computer-executable instructions that, upon execution by the processor 206, can cause the processor 206 and/or one or more other components of the user behavior prediction system 202 (e.g., the obtaining component 212, prediction component 214, classification component 216, prediction analytical model 218, classification analytical model 220, output component 222, and/or training component 224) to perform one or more actions. In one or more embodiments, the memory 204 can store computer-executable components (e.g., the obtaining component 212, prediction component 214, classification component 216, prediction analytical model 218, classification analytical model 220, output component 222, and/or training component 224).

The user behavior prediction system 202 and/or a component thereof as described herein, can be communicatively, electrically, operatively, optically, and/or otherwise coupled to one another via a bus 205 to perform functions of non-limiting system 420, user behavior prediction system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, user behavior prediction system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the user behavior prediction system 202 can reside in the cloud, and/or can reside locally in a local computing environment (e.g., at a specified location(s)).

It is noted that in one or more embodiments, one or more analytical models 218 and/or 220 can be separate from, and thus external to, the user behavior prediction system 202. In one or more embodiments, the prediction component 214 can comprise the prediction analytical model 218 and/or the classification component 216 can comprise the classification analytical model 220.

In addition to the processor 206 and/or memory 204 described above, user behavior prediction system 202 can comprise one or more computer and/or machine readable, writable, and/or executable components and/or instructions that, when executed by processor 206, can facilitate performance of one or more operations defined by such component(s) and/or instruction(s).

Turning now first to the obtaining component 212, the obtaining component 212 can locate, find, search, and/or otherwise obtain user behavior data from a digital medium 280. The user behavior data can comprise digital medium interfaces visited, times at each interface, visitation patterns, sequence of visitation, information entered, information searched for, and/or the like, without being limiting. The obtaining component 212 also can format the data, such as logging the data at one or more tables, logs, matrices, and/or the like.

For example, in one or more embodiments, the obtaining component 212 can gather data in the form of the Table A, provided below. Table A comprises different user IDs of different users, different session IDs of different sessions of use of the digital medium 180, sequence of interfaces (e.g., pages) visited, time at each interface, and whether any action taken by the user is a conversion action.

As used herein, a conversion action can be defined as an action a customer takes that is of value to the business. For example, a conversion action can be any action that achieves a conversion objective of the digital medium 280, such as joining a mailing list, making a purchase, providing a donation, and/or the like.

Looking to the first row of Table A, the user visited page 97 for 95.72 seconds, page 80 for 87.13 seconds, and page 24 for 0.0 seconds. One of the pages, and/or an interface thereat, comprised and/or facilitated a respective conversion. Differently, the first number of the page sequence, in one or more embodiments, can represent a manner of accessing the digital medium, such as organically (e.g., by typing a URL), social media link, search engine and/or referral link, among others. Other values that could be added to Table A can include sequence length, how many interfaces the user visited before leaving the digital medium, how many interfaces visited or time until conversion, classification of order of visitation of interfaces, and/or the like. Indeed, there are a plurality of types/categories of user behavior data that can be obtained by the obtaining component 212.

TABLE A

| User-ID | Session-ID | Page sequence | Time sequence [s] | Conversion |
| --- | --- | --- | --- | --- |
| 91358221913 | 1569933243 | [125, 97, 84, 24] | [95.72, 87.13, 0.0] | 1 |
| 10457038123 | 1570463342 | [125, 80, 79, 78, 89] | [56.62, 13.57, 22.67, 0.0] | 0 |
| 53098284011 | 1569907778 | [126, 79, 97, 84, 24] | [6.4, 77.36, 139.74, 0.0] | 1 |

In one or more embodiments, other formatting approaches can comprise and/or can further comprise normalization of datasets relative to one another, weighting the data, For example, data relative to converters (e.g., a user that performs a conversion action), as opposed to non-converters, can be more heavily weighted.

In one or more embodiments, the obtaining component 212 also can gather a historical prediction and/or classification, such as one previously output by the prediction component 214 and/or classification component 216, respectively, for use by one or more of the analytical models 218 and/or 220 in generating another prediction and/or classification.

Looking next to FIGS. 3 to 6, various schematics illustrate the one or more processes executed by the user behavior prediction system 202 to generate information from the user behavior data.

Figure 3:
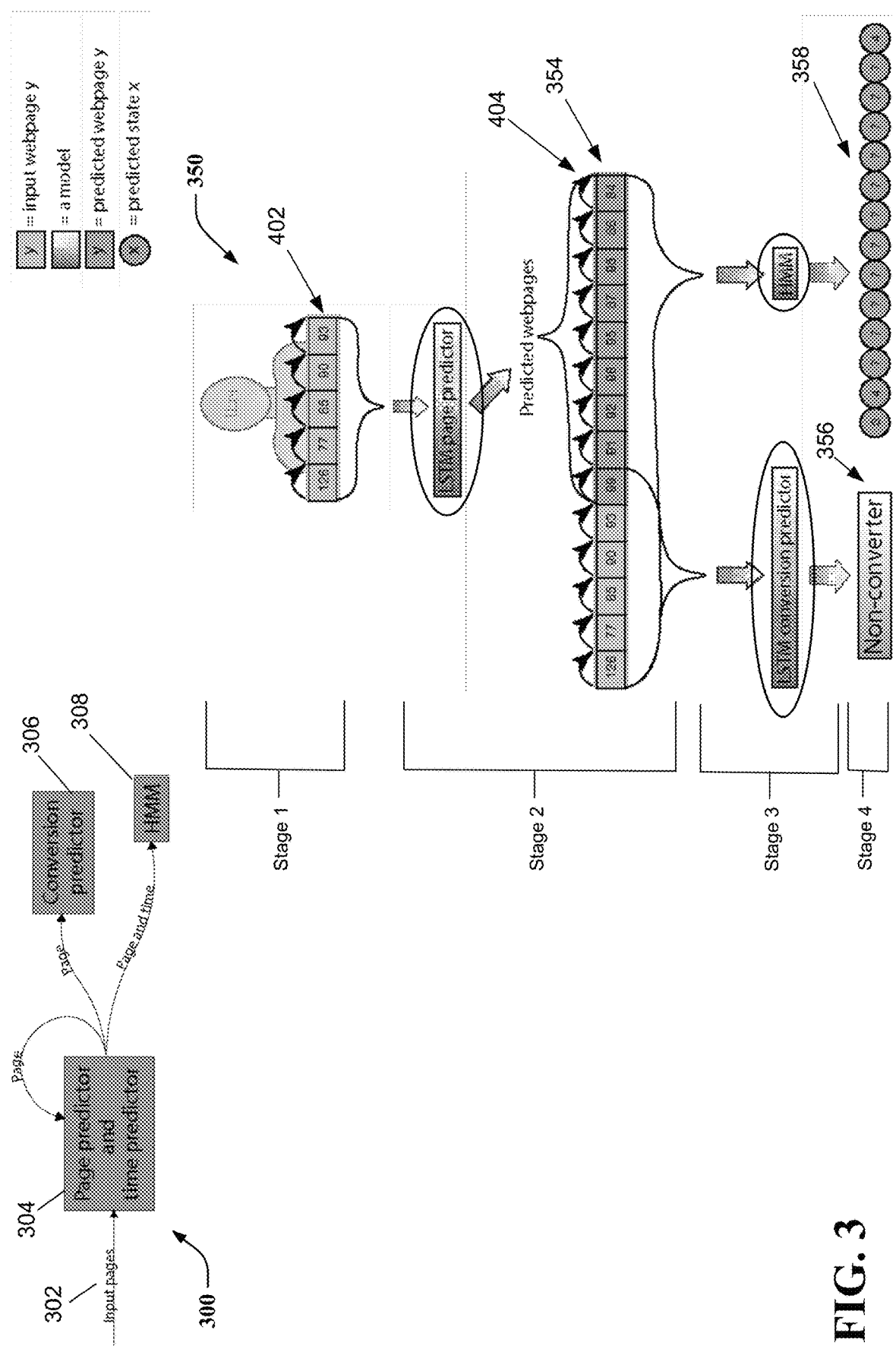
FIG. 3 illustrates a schematic representation of one or more processes performed by the non-limiting system of FIG. 2, in accordance with one or more embodiments described herein.

For example, at FIG. 3, the schematic 300 generally illustrates the prediction and classification process simply. That is, user behavior input 302, such as input pages and information thereabout, can be employed by the prediction component 214 to generate one or more page or time predictions 304. These page and time predictions 304 can be re-employed by the prediction component 214, such as at run time, relative to dynamically changing user behavior data 302. The page predictions 304 also can be employed to determine, by the prediction component 214, whether the user will convert or perform a conversion action (e.g., conversion predictor 306). The page and time predictions 304 also can be employed to determine, by the classification component 216, such as employing a Hidden Markov Model (HMM) 308, one or more classifications of the user's position in a path to a conversion objective (e.g., performance of a conversion action).

At the schematic 350, similar processes are illustrated including a page prediction 354, conversion prediction 356, and stage prediction 358. The information defined by the schematic 350 will be further explained relative to FIGS. 4 to 6.

Figure 4:
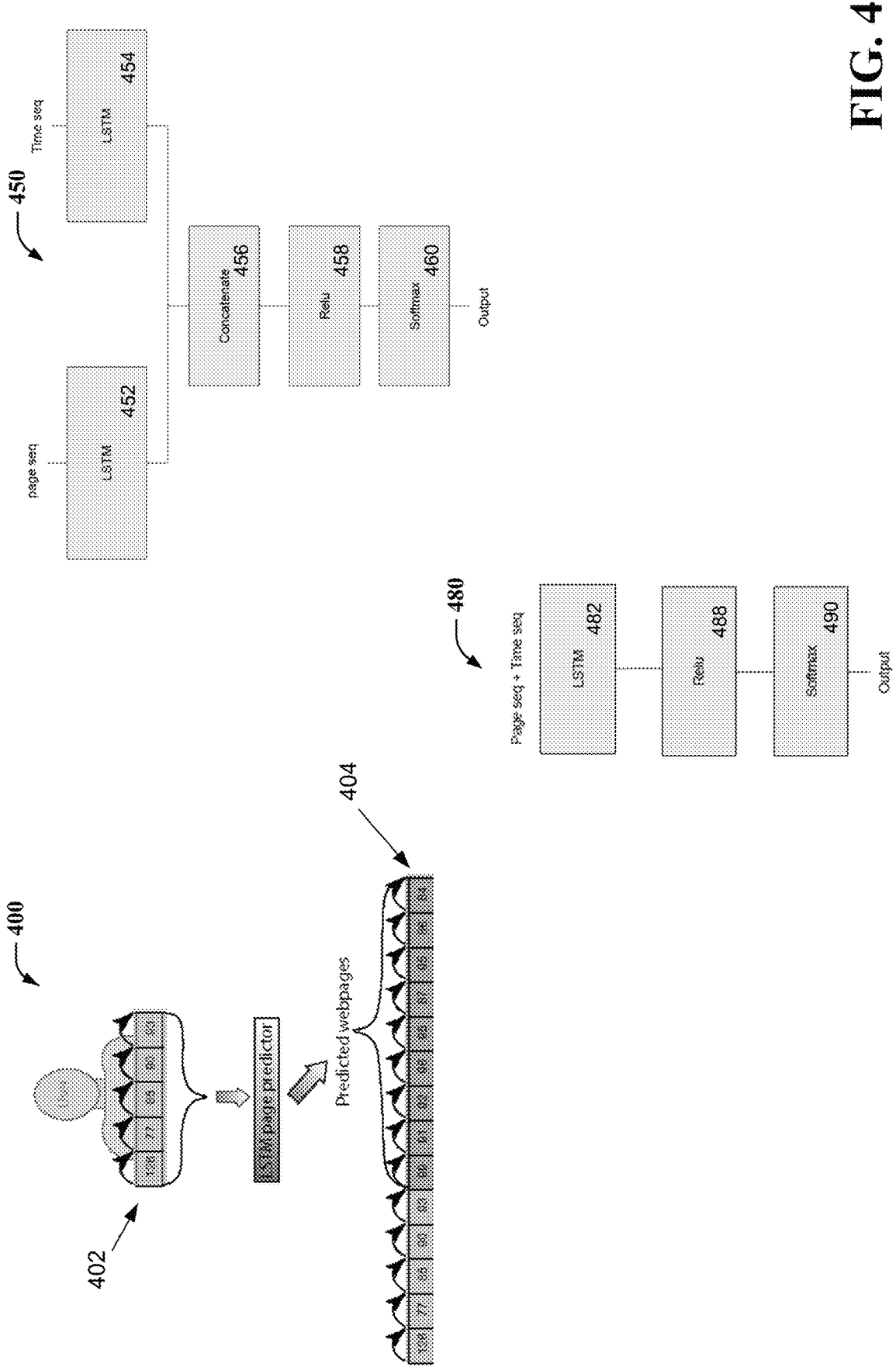
FIG. 4 illustrates another schematic representation of one or more processes performed by the non-limiting system of FIG. 2, in accordance with one or more embodiments described herein.

Turning first to schematic 400 at FIG. 4, and to the prediction component 214, a goal of the user behavior prediction system 202 can be to predict one or more digital medium interfaces 404 that the user will visit next. The prediction component 214 further can determine an order of the one or more digital medium interfaces 404 that are predicted. These digital medium interfaces 404 can be predicted to be those that will be visited by the user, in a particular order, such as in a same session as that from which the user behavior data 402 was obtained. In one or more embodiments, the prediction component 214 further can predict a greater number of digital medium interfaces 404 than comprised by the user behavior data 402.

To perform the aforementioned page prediction (e.g., interface prediction), the prediction component 214 can employ an analytical model 218. The analytical model 218 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised.

For example, the analytical model 218 can comprise a deep neural network (DNN) or a recurrent neural network (RNN). An RNN can employ a feedback loop to enable information to go back into earlier steps in a network to affect an outcome. That is, the network can employ "older" information to determine a new output. This can be accomplished by one or more hidden states of a network. The function of a hidden state can be to pass on information from the previous steps of a sequence further down the chain. Because, relative to an RNN, the gradient used to update the weights of the network can get smaller or each step further back in time, long short term memory (LSTM) model can be employed by the analytical model 218.

That is, the analytical model 218 can comprise and/or otherwise be based on a long short term memory (LSTM) model. An LSTM model can have a capacity to use information further back in a sequence to evaluate what is the most likely outcome, and thus can be useful for long sequences presented.

In one embodiment of the LSTM model, shown at 450, two LSTM layers 452, 454 can be employed with one for pages and one for times. After the LSTM layers, a concatenate layer 456 can be employed to stack the inputs from the LSTM before being sent to the dense rectified linear unit (ReLU) layer 458 and dense output layer 460 with softmax activation. The concatenate layer 456 can combine the outputs from the LSTM layers into one by adding a second output to the end of a first output. The ReLu layer 458 can provide an activation function that can return a value of an input if the value of the input is greater than zero, and can return zero if the value of the input is negative.

Because the LSTM layers 452, 454 output different categories (e.g., pages and time), sigmoid and/or softmax functions can be appropriate for these models for predicting category probabilities. A sigmoid function can return a result between 0 and 1 for each neuron. An example sigmoid function can be Equation 1.

$$\text{Sigmoid: } S(x) = \frac{1}{1 + \exp(-x)}. \quad \text{Equation 1}$$

A softmax function can calculate a probability for each neuron by dividing the neuron value with the sum of the values for all neurons. An example softmax function can be Equation 2.

$$\text{Softmax: } S(y)_i = \frac{\exp(y_i)}{\sum_{j=1}^{N} \exp(y_j)}. \qquad \text{Equation 2}$$

In another embodiment of the LSTM model, shown at 480, can comprise a single LSTM layer 482 with both page and time as input. The LSTM layer 482 can be followed by a dense ReLU layer 488 and a dense softmax output layer 490.

Relative to either model 450 or 480, both binary- and categorical cross entropy loss functions can be employed. For example, the binary cross entropy loss function can be employed with sigmoid activation and the categorical cross entropy loss function can be employed with softmax activation. Depending on the error from the loss function, an optimizer at each model can adjust the model parameters. Different optimizers can be employed with different learning rates.

At additional embodiments of the LSTM models, not shown, a second LSTM layer can be added after (e.g., following) the second LSTM layer. This can create a stacked model where output from the first LSTM layer can work as input for the second LSTM layer. In this way, the LSTM process can be repeated in the second LSTM layer using only key information from the output from the first LSTM layer.

In one or more other embodiments, the existing LSTM layer can be made bidirectional. In this way, the model can be trained twice on the input data, such as once as a regular input and once backwards where output is used as input.

In one or more other embodiments, a dropout layer can be added to avoid overfitting the model. A dropout layer can randomly ignore a number of units during training, making the training noisy. Though, this can force units to modify the responsibility to cover for the ignored units, which can make the model more robust.

In one or more other embodiments, different training manipulations can be employed for the models. This can include creating sequences with same number of time steps, padding to add time steps to change sequences to the same length, and/or dividing the sequences into smaller sequences. Additionally, or alternatively, one-hot encoding for both pages and times, embedding, scaling the pages and time, and/or changing the parent categories to minimize the number of different categories the model predicts can be employed.

Figure 5:
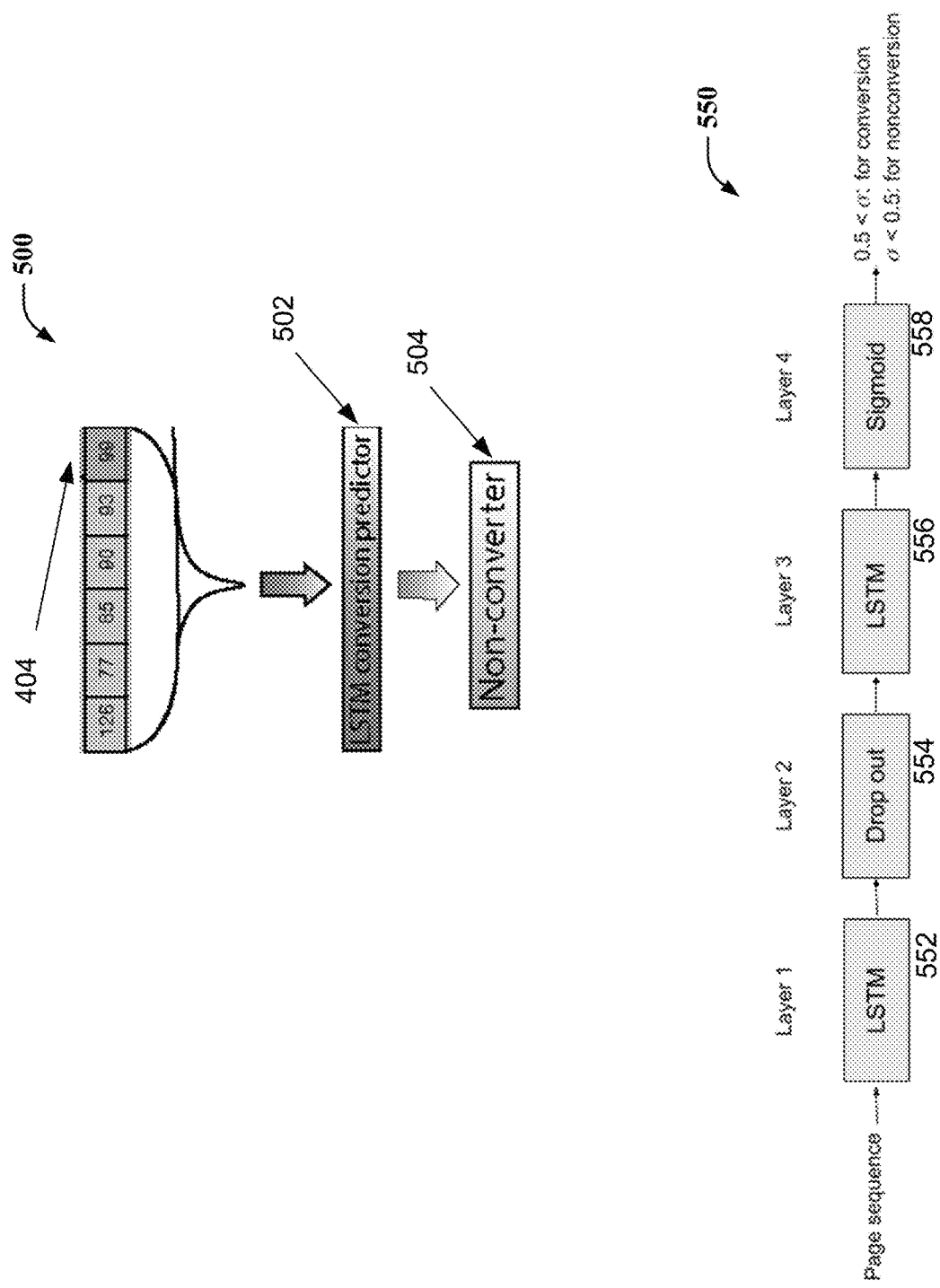
FIG. 5 illustrates yet another schematic representation of one or more processes performed by the non-limiting system of FIG. 2, in accordance with one or more embodiments described herein.

Turning now to FIG. 5, the prediction component 214 further can perform a conversion prediction 4.4. That is, based on user behavior data, the prediction component 214 can predict whether the conversion objective will be achieved. As shown at sequence 550 of FIG. 5, a separate LSTM-based model can be employed, which can be comprised by analytical model 218 and/or an analytical model different from analytical model 218. The sequence 550 can comprise to LSTM layers with the objective to reach a higher accuracy. For example, the sequence 550 can comprise a first LSTM layer 552, a drop out layer 554, a second LSTM layer 556, and then a sigmoid activation layer 558, all in sequence.

That is, as one example at schematic 500, the predicted digital medium interfaces (e.g., predicted pages) 404 can be employed as input to the LSTM conversion predictors 502, which can then output a prediction 504. The output of zero to one from the sigmoid activation function can then be interpreted as a conversion or non-conversion. For example, $0.5 < \sigma$ can be a conversion, and $\sigma < 0.5$ can be a non-conversion.

Figure 6:
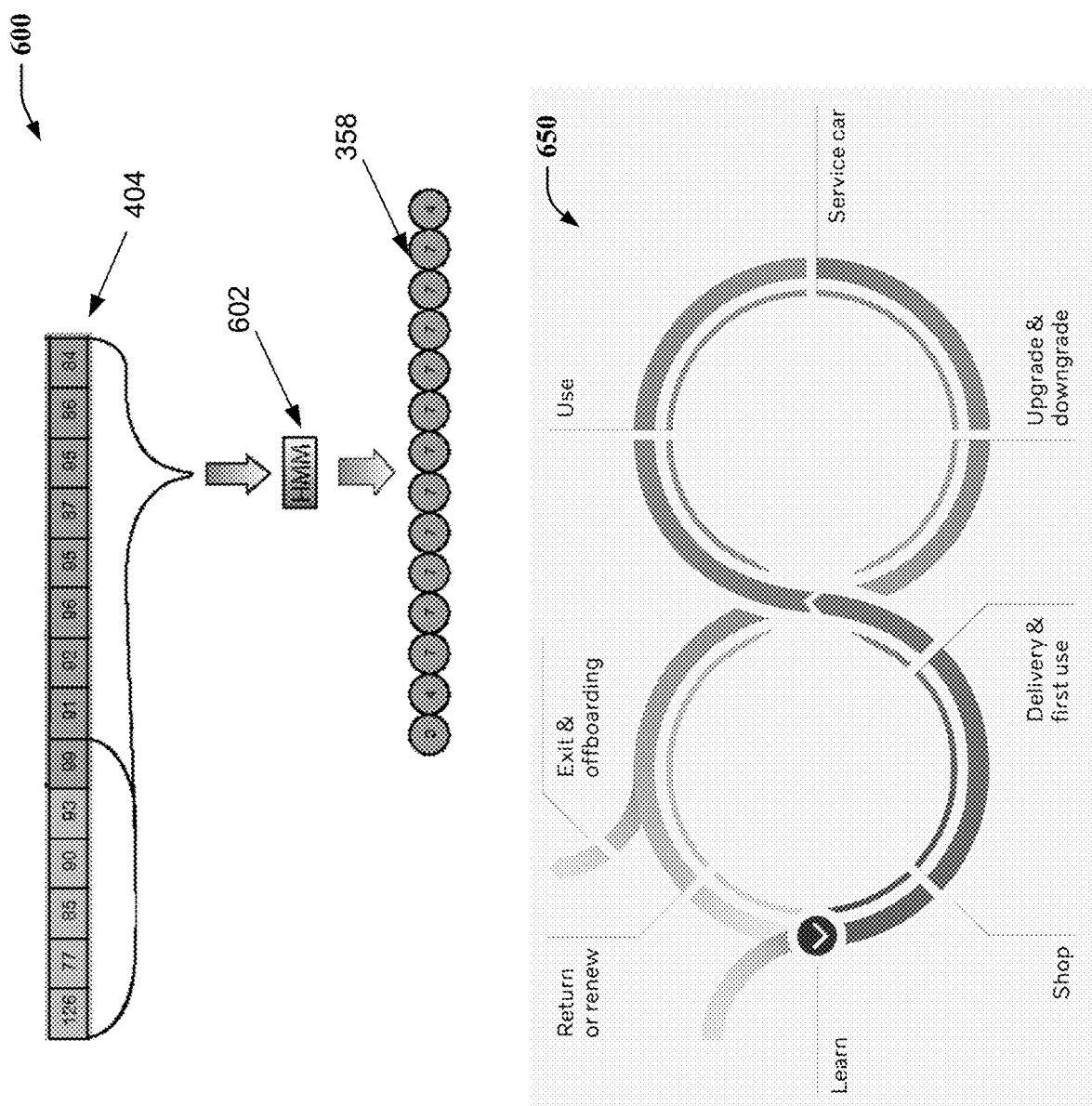
FIG. 6 illustrates still another schematic representation of one or more processes performed by the non-limiting system of FIG. 2, in accordance with one or more embodiments described herein.

Turning now to FIG. 6 and to the classification component 216, a goal of the user behavior prediction system 202 can be to categorize users based on their behavior on the website and where a user is positioned in a customer journey. As used herein, the term "customer journey" can be defined as a defined path that culminates in the conversion objective. It is noted that this classification type does not employ conventional demographics.

Briefly, as illustrated at schematic 600, the predicted digital medium interfaces (e.g., predicted pages) 404 can be employed as input to the HMM 602. The stage prediction 358 can comprise a series of stages at which the user is classified as being positioned at relative to each interface visited.

To perform the aforementioned classification and stage prediction, the classification component 216 can employ an analytical model 220. The analytical model 220 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 220 can comprise a deep neural network (DNN) or a recurrent neural network (RNN).

The analytical model 220 can comprise and/or otherwise be based on an HMM. The Hidden Markov Model (HMM) 602 can comprise a set of parameters, such as hidden states, transition matrix, observations and emission matrix. A hidden state can be a Markov chain of the desired data which can not directly be observed. A transition matrix can represent the likelihood of transitions from a specific state to every other state where n is the number of states. Observations can be the observed Markov chain. An emission matrix can represent the likelihood of a specific observation to every state, where n is the number of states and k is the number of observations.

Generally an HMM can predict hidden states X given observations Y. An HMM algorithm can rely on an assumption that X is dependent on Y. For the HMM to be able to solve the likelihood of a certain chain of hidden states, the transition matrix A and the emission matrix B are known. Various, such as all possible, ways through X given Y can then be calculated as the emission probability and transition probability for each individual step. Thus, for each new observation, the probability of the whole sequence can shrink by the probability of the emission from the observation, to the state multiplied by the transition likelihood from the previous state.

The probability for the complete sequence can therefore be the probability iterated for the length of the sequence Y, as represented by Equation 3, where S is the observed sequence, $\pi$ is the predicted sequence of states, HMM is the model with the parameters $\Theta$, and x is the probability of $\pi$ given the input arguments and can be scaled down with the logarithm base 10.

$$P(S, \pi | HMM, \Theta) = x. \qquad \text{Equation 3:}$$

In one or more embodiments, the HMM 602 can be trained based on unsupervised learning. In this way, when training the model, no tags or desired outcome can be given to the HMM, allowing the model to find patterns and cluster data points by itself.

In one or more embodiments, a base model for the HMM can be developed via a first framework. Each known page (website interface) can be combined with a corresponding time to one value. Time intervals can consist of different groups, such as with equal samples. In one embodiment 4 different groups can be employed.

The input data $Pages_j$ and the appropriate $Group_i$(time interval) for each $Times_j$ can be passed through an Equation such as Equation 4.

$$Input_j = Pages_j + I*1000 = \{Times_j \rightarrow Group_i, Pages_j = \text{current page number}\}. \quad \text{Equation 4:}$$

In one or more embodiments, a base model for the HMM can be developed via a second framework. Information about the sequences can be preserved as opposed to grouping in time intervals. This can be accomplished by adding time as an extra feature to each data point before a new sequence is passed as input in flattened format. Flattened data can be employed and the input shape can be represented by Equation 5.

$$[\text{length of sequence},2] \rightarrow \text{flatten} \rightarrow [1, 2 \cdot \text{length of sequence}]. \quad \text{Equation 5:}$$

In one or more embodiments, both page number and times can be standardized separately using Equation 6.

$$z = (x-\mu)/\sigma. \quad \text{Equation 6:}$$

In one or more embodiments, the user behavior prediction system 202 further can determine one of a plurality of HMM model iterations to employ for the user, such as based on user identification and/or user behavior data, whether historical or new. For example, relative to a vehicle sales digital medium, different HMM iterations can be trained and provided for users interested towards electric and hybrid vehicles, users interested in a vehicle suitable for a large family, users interested in a car for a family with older children or a smaller family, and/or users interested in the latest technology.

In one or more embodiments, the defined path can begin with a first access of the digital medium 280 (e.g., an entry). The defined path can end with a conversion action (e.g., a conversion event). Between the entry and conversion event, the path further can be defined by a plurality of stages, such as review, overview and decide.

A plurality of stages can define a path to a conversion objective. One or more stages can define a conversion action stage.

As illustrated at schematic 650, these stages, in but one non-limiting example, can comprise learning, shopping, delivery & first use, use, vehicle service, upgrade & downgrade, exit & offboarding, and/or return or renew. That is, an end of a sequence can be an exit & offboarding stage or a return/renew stage.

For another example, Table B below illustrates but one example of a set of stages that can define a customer journey, such as relative to a purchase/sales-based digital medium.

TABLE B

| State | Customer journey position | Possible description depending on most common webpages |
|---|---|---|
| 0 | Decide | Considering conversion |
| 1 | Customer | Shopping/Information |
| 2 | Customer | Checkout/Newsletter |

TABLE B-continued

| State | Customer journey position | Possible description depending on most common webpages |
|---|---|---|
| 3 | Entry | First pages |
| 4 | Overview | Information seeker |
| 5 | Slow explore | Information/Configuration |
| 6 | Decide | Information/Configuration |
| 7 | Explore | Configuration |
| 8 | Slow explore | Information |
| 9 | Customer | Converted/Care |
| 10 | Slow explore | Configuration |
| 11 | Customer | Converted/Information |

A user can progress through stages in a different order than another user. A user can skip one or more stages as compared to another user. A user can repeat stages as compared to another user.

Relative to the position classification, the classification component 216 further can match one or more website interfaces 402, 404 to one or more ontology classes, such as the varying stages. In this way, a dynamic and varied progression through the stages can be identified by the classification component 216. That is, each user may not proceed in a default order through the stages.

Turning now again only briefly to FIG. 3, a summary of FIGS. 4 to 6 is provided.

Turning first again to schematic 300, described above, a general description of the user behavior prediction system 202 is described. To provide more information to the HMM and conversion predictor with the aim of achieving better classifications, both can be connected to the page predictor. As illustrated at schematic 300, the input pages 302 first can be passed through the page predictor 304 to predict the following page. The extended page sequence can then be distributed to the HMM 308 and conversion predictor 306. The procedure can be repeated a plurality of time until the page sequence has reached the length of the mean conversion user, for example.

Also as shown at schematic 300, the predictor 304 can comprise a time predictor since the page predictor alone does not provide a time corresponding to the predicted pages. The predicted times can be produced by comparing the time for each specific page to the average time of that page. This can provide a time fact $t_{factor}$ of how fast the user navigates the website or other full set of interfaces. The times for the predicted pages $t_{predicted}$ can then be calculated by the average time for the specific page $t_{mean,i}$, multiplied with $t_{factor}$. This is illustrated below at Equation 7, where $t_{mean,i}$ is the mean time for page i.

$$t_{predicted} = t_{mean,i} \cdot t_{factor}. \quad \text{Equation 7:}$$

Turning next to schematic 350, at stage 1, the user behavior prediction system 202 can receive and/or otherwise obtain the first interfaces of the user behavior data 402. These interfaces (indicated as pages or webpages at the schematic 350) can be employed as input from the LSTM model.

At stage 2, the prediction component 214 can predict a series of interfaces 404 that are computed to be visited next by the user. These interfaces 404 can be sent back to the LSTM model and also to the HMM.

At stage 3, the LSTM model/prediction component 214 can predict whether or not a conversion will occur. Simultaneously, at least partially concurrently, and/or separately, the HMM/classification component 216 can classify a position of the user in the path to the conversion objective.

At stage 4, the outputs of the prediction component 214 and of the classification component 216 can be output. For example, the conversion prediction 356 can be that the user will be a non-converter, at least in the present session at the digital medium 280. The stage prediction 358 can comprise a series of stages at which the user is classified as being positioned at relative to each interface visited.

Figure 7:
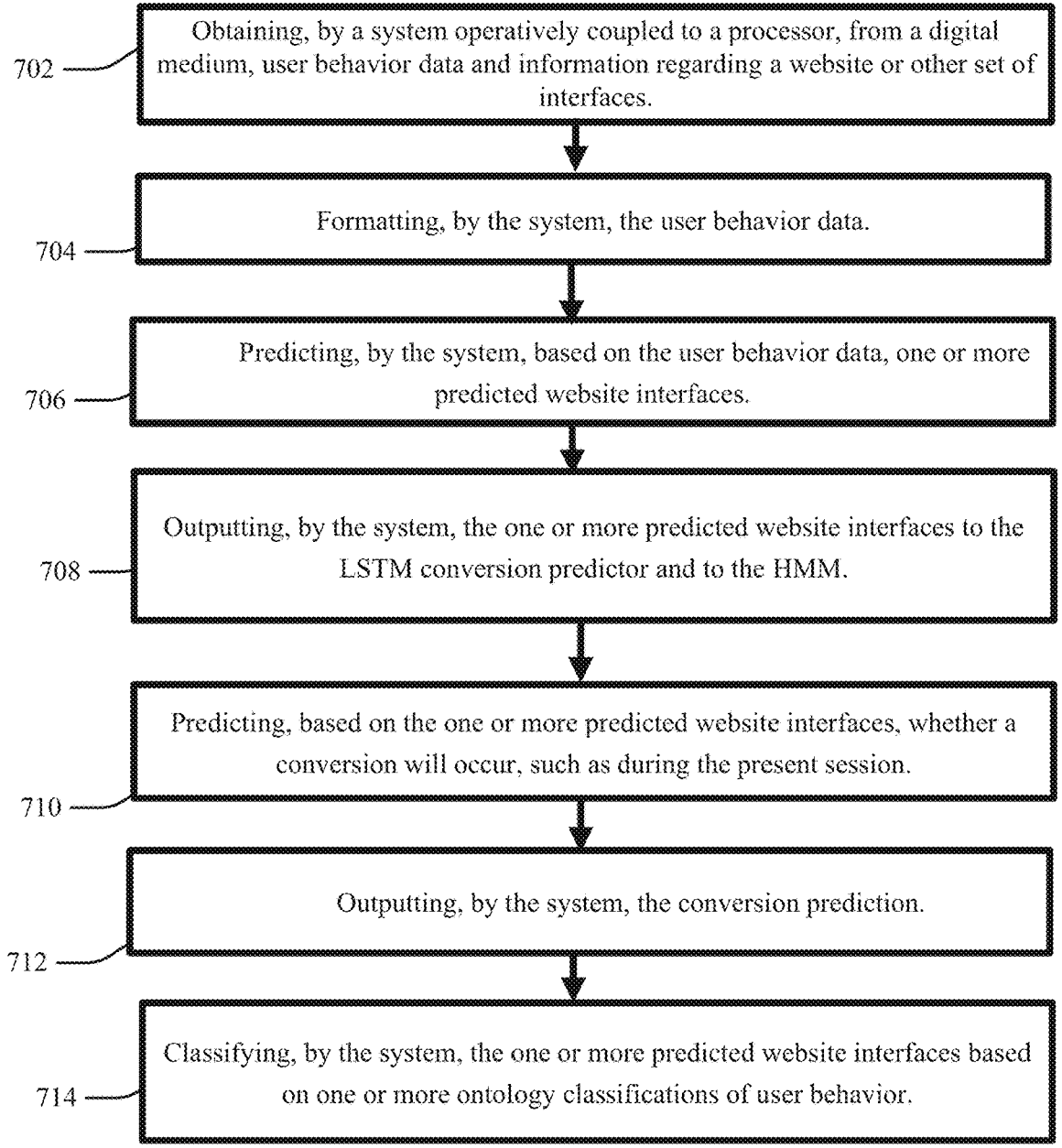
FIG. 7 illustrates a process flow of a method of guiding user behavior at a digital medium, in accordance with one or more embodiments described herein.

Turning now to the next figure not yet discussed, FIG. 7, illustrated is a flow diagram of an example, non-limiting computer-implemented method 700 that can facilitate a process to guide user behavior at a digital medium, such as the digital medium 280, in accordance with one or more embodiments described herein. While the computer-implemented method 600 is described herein relative to the user behavior prediction system 202 of FIG. 2, and relative to the block diagrams of FIGS. 3 to 6, the computer-implemented method 700 likewise can be applicable to other embodiments, such as illustrated at FIG. 1. Repetitive description of like elements employed in one or more other embodiments described herein is omitted for sake of brevity.

At 702, the computer-implemented method 700 can comprise obtaining, by a system operatively coupled to a processor (e.g., obtaining component 212), user behavior data and information regarding a website or other set of interfaces.

At 704, the computer-implemented method 700 can comprise formatting, by the system (e.g., obtaining component 212), the user behavior data.

At 706, the computer-implemented method 700 can comprise predicting, by the system (e.g., prediction component 214 and analytical model 218), based on the user behavior data, one or more predicted webpages (e.g., website interfaces 404).

At 708, the computer implemented method 700 can comprise outputting, by the system (e.g., prediction component 214) the one or more predicted website interfaces to the LSTM conversion predictor and to the HMM.

At 710, the computer-implemented method 700 can comprise predicting, by the system (e.g., prediction component 214 and analytical model 218) based on the one or more predicted webpages, whether a conversion will occur, such as during the present session.

At 712, the computer-implemented method 700 can comprise outputting, by the system (e.g., prediction component 214) the conversion prediction.

At 714, the computer-implemented method 700 can comprise classifying, by the system (e.g., prediction component 214) the one or more predicted website interfaces based on one or more ontology classifications of user behavior.

Referring now again to FIG. 2, in one or more embodiments, the user behavior prediction system 202 can comprise a training component 224. The training component 224 can train one or more of the analytical models 218 and/or 220 based on various data/access/use/behavior associated with the one or more digital medium 280, digital medium interfaces 282, conversion objectives and/or conversion actions, such as based on historical data and/or test data defining these aspects. In one or more cases, historical data can be stored at the memory 204 and/or at any other suitable store internal to and/or external to the user behavior prediction system 202. The training component 224 can execute the training at any suitable frequency, such as after each prediction/classification process iteration, based on a selected timing, and/or on-demand. Via the training, the analytical models 218 and 220 can be continually updated. Further, via the training, subsequent iterations of use of the user behavior prediction system 202 can be made more accurate and/or efficient.

Referring still to FIG. 2, after generation of interface prediction and conversion prediction by the prediction component 214, and/or after determination of the position classification by the classification component 216, the output component 222 can generally guide the user to the conversion objective by providing a communication to the user based on a pattern of recent user behavior defined by the user behavior data. Put another way, the output component 222 can recommend and/or provide a communication or digital medium interface, for example, to the user during use of the digital medium by the user. The recommended communication can be an advertisement, suggestion, link, feedback, purchase information and/or the like, that can guide the user to a conversion action. Likewise, the digital medium interface recommended can comprise an advertisement, suggestion, link, feedback, purchase information and/or the like, that can guide the user to a conversion action.

Figure 8:
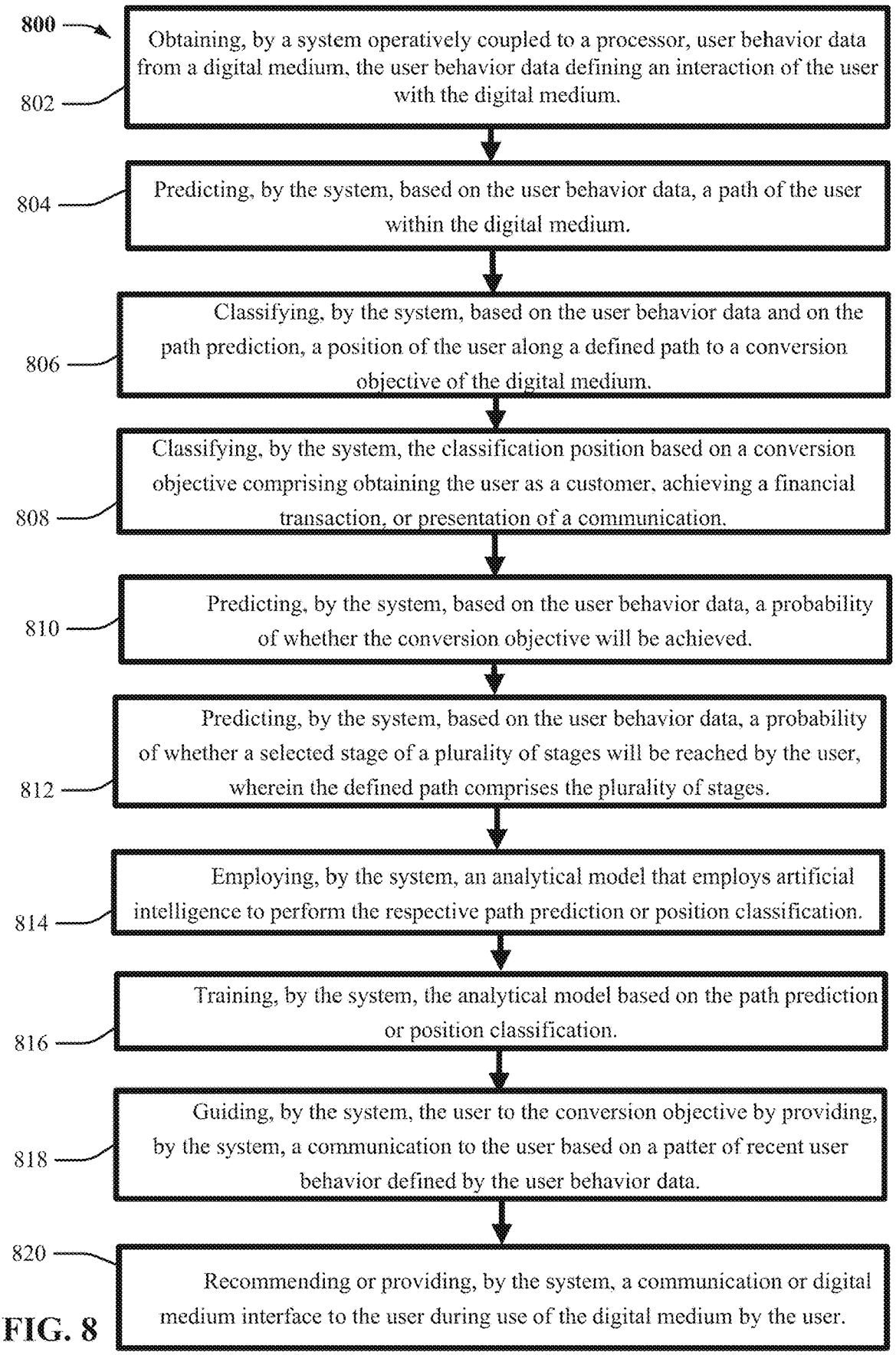
FIG. 8 illustrates another process flow of a method of guiding user behavior at a digital medium, in accordance with one or more embodiments described herein.

Turning now to FIG. 8, illustrated is a flow diagram of an example, non-limiting computer-implemented method 800 that can facilitate a process to guide a user at a digital medium, in accordance with one or more embodiments described herein. While the computer-implemented method 800 is described herein relative to the user behavior prediction system 202 of FIG. 2, and relative to the block diagrams of FIGS. 3 to 6, the computer-implemented method 800 likewise can be applicable to other embodiments, such as illustrated at FIG. 1. Repetitive description of like elements employed in one or more other embodiments described herein is omitted for sake of brevity.

At 802, the computer-implemented method 800 can comprise obtaining, by a system operatively coupled to a processor (e.g., obtaining component 212), user behavior data from a digital medium, the user behavior data defining an interaction of the user with the digital medium.

At 804, the computer-implemented method 800 can comprise predicting, by the system (e.g., prediction component 214), based on the user behavior data, a path of the user within the digital medium.

At 806, the computer-implemented method 800 can comprise classifying, by the system (e.g., classification component 216), based on the user behavior data and on the path prediction, a position of the user along a defined path to a conversion objective of the digital medium.

At 808, the computer-implemented method 800 can comprise classifying, by the system (e.g., classification component 218), the classification position based on a conversion objective comprising obtaining the user as a customer, achieving a financial transaction, or presentation of a communication.

At 810, the computer-implemented method 800 can comprise predicting, by the system (e.g., prediction component 214), based on the user behavior data, a probability of whether the conversion objective will be achieved.

At 812, the computer-implemented method 800 can comprise predicting, by the system (e.g., prediction component 214), based on the user behavior data, a probability of whether a selected stage of a plurality of stages will be reached by the user, wherein the defined path comprises the plurality of stages.

At 814, the computer-implemented method 800 can comprise employing, by the system (e.g., prediction component 214 and/or classification component 216), an analytical model (e.g., analytical model 218 and/or analytical model 220, respectively) that employs artificial intelligence to perform the respective path prediction or position classification.

At 816, the computer-implemented method 800 can comprise training, by the system (e.g., training component 224), the analytical model based on the path prediction or position classification.

At 818, the computer-implemented method 800 can comprise guiding, by the system (e.g., output component 222), the user to the conversion objective by providing, by the system (e.g., output component 222), a communication to the user based on a pattern of recent user behavior defined by the user behavior data.

At 820, the computer-implemented method 800 can comprise recommending or providing, by the system (e.g., output component 222), a communication or digital medium interface to the user during use of the digital medium by the user.

In summary, one or more embodiments herein can facilitate a process to guide a user at a digital medium. An exemplary system can comprise a memory that stores computer executable components, and a processor that executes the computer executable components stored in the memory, wherein the computer executable components can comprise an obtaining component that obtains user behavior data from a digital medium, the user behavior data defining an interaction of the user with the digital medium, a prediction component that, based on the user behavior data, predicts a path of the user within the digital medium, and a classification component that, based on the user behavior data and on the path prediction, classifies a position of the user along a defined path to a conversion objective of the digital medium. The conversion objective can comprise obtaining the user as a customer, achieving a financial transaction, or presentation of a communication.

For example, one or more applications of the user behavior prediction system 202 can comprise improvements to a website or other set of interfaces, such as to increase conversion. This can include associated adaptation of layout, advertisement or guiding functions. One or more additional applications of the user behavior prediction system 202 can comprise targeted marketing, such as to users stuck in a decide state. That is more time, energy and/or manual labor can be spent on such users, such as if a conversion likelihood passes and/or meets one or more thresholds.

Further in one or more embodiments, a position in the customer journey of a user can be evaluated over a plurality of sessions, and or in a sequence of sessions, to provide a more enhanced assessment of user behavior.

The one or more innovations, frameworks, systems, devices and/or methods described herein can be additionally, and/or alternatively described as follows:

A system can comprise a memory that stores computer executable components, and a processor that executes the computer executable components stored in the memory, wherein the computer executable components can comprise an obtaining component that obtains user behavior data from a digital medium, the user behavior data defining an interaction of the user with the digital medium, a prediction component that, based on the user behavior data, predicts a path of the user within the digital medium, and a classification component that, based on the user behavior data and on the path prediction, classifies a position of the user along a defined path to a conversion objective of the digital medium.

At the system, the conversion objective optionally comprises obtaining the user as a customer, achieving a financial transaction, or presentation of a communication.

Relative to the system of any previous paragraph, the prediction component further predicts, based on the user behavior data, a probability of whether the conversion objective will be achieved.

Relative to the system of any previous paragraph, the defined path comprises a plurality of stages, and the prediction component further predicts, based on the user behavior data, a probability of whether a selected stage of the plurality of stages will be reached by the user.

Relative to the system of any previous paragraph, the prediction component, the classification component or both employ an analytical model that employs artificial intelligence to perform the respective path prediction or position classification.

The system of any previous paragraph, further comprising a training component that trains the analytical model based on the outputs of the prediction component and the classification component.

The system of any previous paragraph, further comprising: an output component that guides the user to the conversion objective by providing a communication to the user based on a pattern of recent user behavior defined by the user behavior data.

The system of any previous paragraph, further comprising an output component that recommends or provides a communication or digital medium interface to the user during use of the digital medium by the user.

A computer-implemented method comprises obtaining, by a system operatively coupled to a processor, user behavior data from a digital medium, the user behavior data defining an interaction of the user with the digital medium, predicting, by the system, based on the user behavior data, a path of the user within the digital medium, and classifying, by the system, based on the user behavior data and on the path prediction, a position of the user along a defined path to a conversion objective of the digital medium.

The computer-implemented method, wherein the conversion objective comprises obtaining the user as a customer, achieving a financial transaction, or presentation of a communication.

The computer-implemented method of any previous paragraph, further comprising predicting, by the system, based on the user behavior data, a probability of whether the conversion objective will be achieved.

The computer-implemented method of any previous paragraph, wherein the defined path comprises a plurality of stages, and wherein the computer-implemented method further comprises predicting, by the system, based on the user behavior data, a probability of whether a selected stage of the plurality of stages will be reached by the user.

The computer-implemented method of any previous paragraph, further comprising employing, by the system, an analytical model that employs artificial intelligence to perform the respective path prediction or position classification, and training, by the system, the analytical model based on the outputs of the prediction component and the classification component.

The computer-implemented method of any previous paragraph, further comprising guiding, by the system, the user to the conversion objective by providing, by the system, a communication to the user based on a pattern of recent user behavior defined by the user behavior data.

The computer-implemented method of any previous paragraph, further comprising recommending or providing, by the system, a communication or digital medium interface to the user during use of the digital medium by the user.

An advantage of the device, system, computer-implemented method and/or computer program product discussed above can be employment at a dynamic website interface that can adapt and dynamically provide content based on observation of user use of the website interface. That is, the dynamic website interface can guide a user in a direction, such as in a direction of ownership, purchase, and/or lease.

Another advantage of the device, system, computer-implemented method and/or computer program product discussed above can be a generation of advertisement, campaigns, emails, and/or other communications that can be individualized to a user, based on the observed and predicted behavior of the user.

Yet another advantage of the device, system, computer-implemented method and/or computer program product discussed above can be employment of an artificial intelligence (AI) model, neural network (NN), machine learning (ML) model and/or deep learning (DL) model to predict next actions of a user, to determine next communications and/or website interfaces to provide to the user, and/or to determine a user's position in a customer journey, such as an ownership process, purchasing process, and/or leasing process.

Indeed, in view of the one or more embodiments described herein, a practical application of the systems, computer-implemented methods, and/or computer program products described herein can be an increase in accuracy, precision and/or accuracy in guiding a user to a conversion objective, such as obtaining the user as a customer, achieving a financial transaction, and/or presentation of a communication, without being limited thereto. Overall, such computerized tools can constitute a concrete and tangible technical improvement in the field of digital medium analytics, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to digital medium analytics, as compared to existing systems and/or techniques lacking such approach(es). Systems, computer-implemented methods, and/or computer program products facilitating performance of these processes are of great utility in the field of digital medium analytics, including artificial intelligence-assisted digital medium analytics, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically employ an artificial intelligence process to predict a path of a user within a digital medium or to classify a position of the user along a defined path to a conversion objective of the digital medium, as the one or more embodiments described herein can facilitate this process. And, neither can the human mind nor a human with pen and paper electronically effectively electronically achieve, facilitate and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 9:
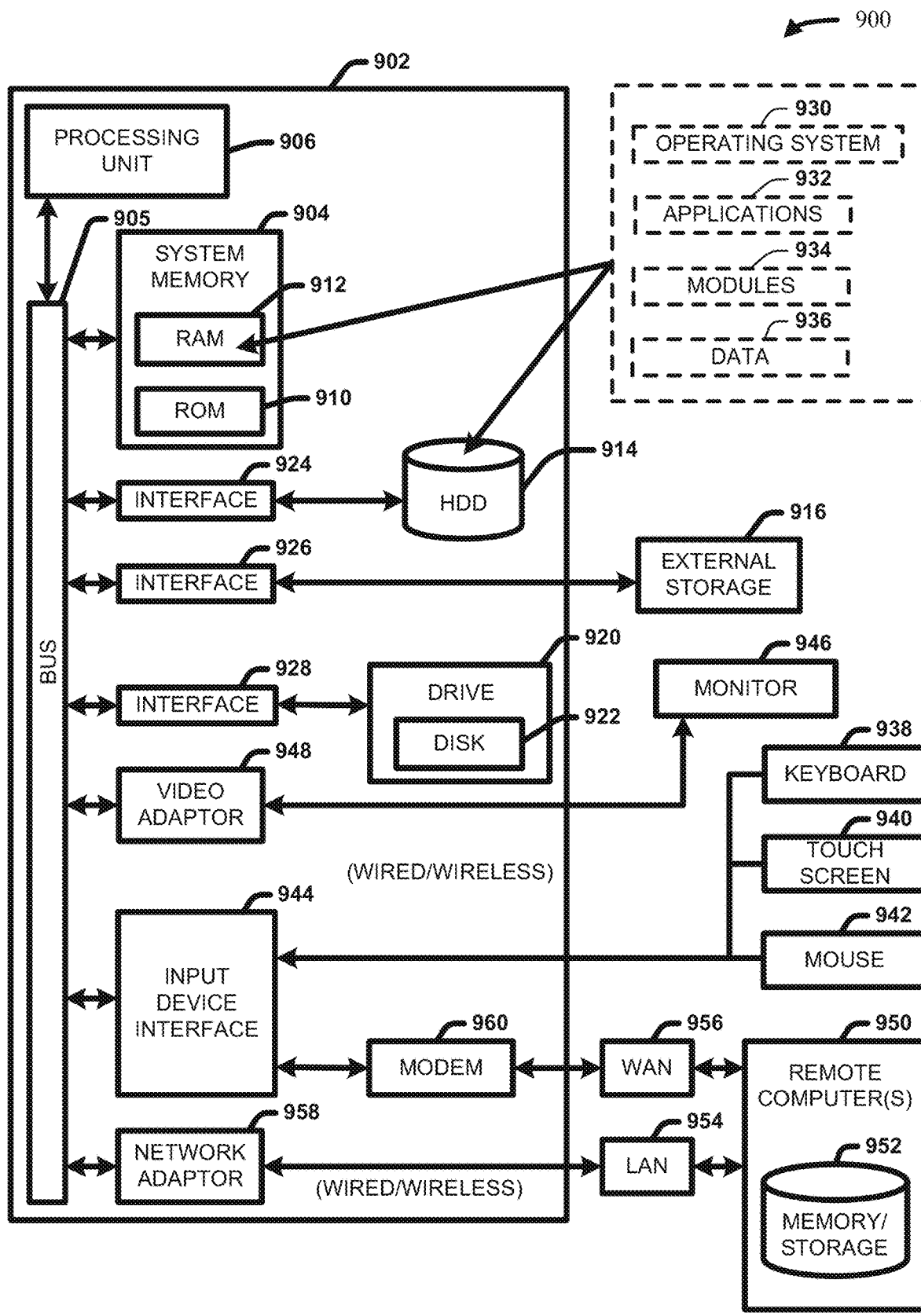
FIG. 9 illustrates a block diagram of an example, non-limiting, operating environment in which one or more embodiments described herein can be facilitated.
Figure 10:
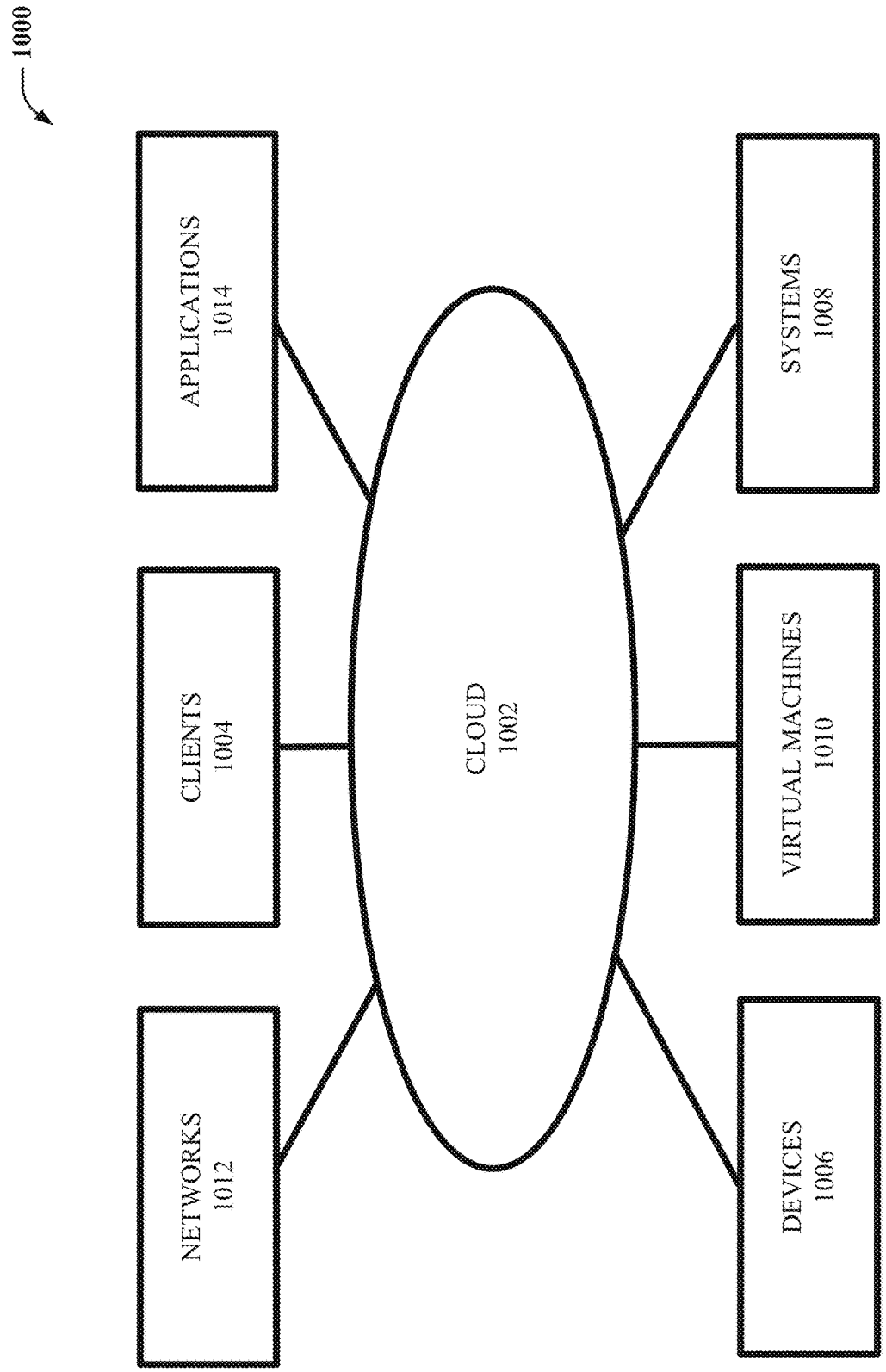
FIG. 10 illustrates a block diagram of an example, non-limiting, cloud computing environment in accordance with one or more embodiments described herein.

Turning next to FIGS. 9 and 10, a detailed description is provided of additional context for the one or more embodiments described herein at FIGS. 1-8.

FIG. 10 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 9, the example operating environment 900 for implementing one or more embodiments of the aspects described herein can include a computer 902, the computer 902 including a processing unit 906, a system memory 904 and/or a system bus 905. One or more aspects of the processing unit 906 can be applied to processors such as 106 and/or 206 of the non-limiting systems 100 and/or 200. The processing unit 906 can be implemented in combination with and/or alternatively to processors such as 106 and/or 206.

Memory 904 can store one or more computer and/or machine readable, writable and/or executable components and/or instructions that, when executed by processing unit 906 (e.g., a classical processor, and/or like processor), can facilitate performance of operations defined by the executable component(s) and/or instruction(s). For example, memory 904 can store computer and/or machine readable, writable, and/or executable components and/or instructions that, when executed by processing unit 906, can facilitate execution of the one or more functions described herein relating to non-limiting system 100 and/or non-limiting system 200, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 906 can comprise one or more types of processors and/or electronic circuitry (e.g., a classical processor and/or like processor) that can implement one or more computer and/or machine readable, writable and/or executable components and/or instructions that can be stored at memory 904. For example, processing unit 906 can perform one or more operations that can be specified by computer and/or machine readable, writable, and/or executable components and/or instructions including, but not limited to, logic, control, input/output (I/O), arithmetic, and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, and/or another type of processor. The examples of processing unit 906 can be employed to implement one or more embodiments described herein.

The system bus 905 can couple system components including, but not limited to, the system memory 904 to the processing unit 906. The system bus 905 can comprise one or more types of bus structure that can further interconnect to a memory bus (with or without a memory controller), a peripheral bus, and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally, and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 905 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules, and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 905, but can be connected by other interfaces, such as a parallel port, an IEEE 1394 serial port, a game port, a USB port, an IR interface, a BLUETOOTH® interface, and/or the like.

A monitor 946 or other type of display device can be alternatively and/or additionally connected to the system bus 905 via an interface, such as a video adapter 948. In addition to the monitor 946, a computer typically includes other peripheral output devices (not shown), such as speakers, printers, and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that facilitates communicating information among one or more embodiments described herein and external systems, sources, and/or devices (e.g., computing devices, communication devices and/or the like).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 905 via the input device interface 944. In a networked environment, program modules depicted relative to the computer 902 or portions thereof can be stored in the remote memory/storage device 952. The network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100 and/or 200, and/or the example operating environment 900 of FIG. 9 can be associated with and/or be included in cloud-based and/or partially-cloud-based system.

Referring now to details of one or more elements illustrated at FIG. 10, the illustrative cloud computing environment 1002 is depicted. Cloud computing environment 1002 can comprise one or more cloud computing nodes, virtual machines, and/or the like with which local computing devices used by cloud clients 1004, such as for example via one or more devices 1006, systems 1008, virtual machines 1010, networks 1012, and/or applications 1014.

The one or more cloud computing nodes, virtual machines and/or the like can be grouped physically or virtually, in one or more networks, such as local, distributed, private, public clouds, and/or a combination thereof. The cloud computing environment 1002 can provide infrastructure, platforms, virtual machines, and/or software for which a client 1004 does not maintain all or at least a portion of resources on a local device, such as a computing device. The various elements 1006 to 1012 are not intended to be limiting and are but some of various examples of computerized elements that can communicate with one another and/or with the one or more cloud computing nodes via the cloud computing environment 1002, such as over any suitable network connection and/or type.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    a memory that stores computer executable components; and
    a processor that executes the computer executable components stored in the memory, wherein the computer executable components comprise:
        a training component that:
            trains, using a set of training data comprising interactions of users with digital mediums, a long short-term memory model employing at least one cross entropy loss function for a plurality of layers of the long short-term memory model to predict users next actions during the interactions with the digital mediums, and predict probabilities of conversion objectives being achieved with the users, and
            trains, using the predicted users next actions, a Hidden Markov model to classify positions of the users along defined paths to the conversion objectives;
        an obtaining component that obtains user behavior data from a digital medium, the user behavior data defining an interaction of a user with the digital medium;
        a prediction component that determines, using the long short-term memory model, based on the user behavior data, a predicted next action of the user within the digital medium; and
        a classification component that classifies, using the Hidden Markov model, based on the user behavior data and the predicted next action, a position of the user along a defined path to a conversion objective of the digital medium.

2. The system of claim 1, wherein the conversion objective comprises obtaining the user as a customer, achieving a financial transaction, or presentation of a communication.

3. The system of claim 1, wherein the prediction component further determines, using the long short-term memory model, based on the user behavior data, a probability of that the conversion objective will be achieved with the user.

4. The system of claim 1, wherein the defined path comprises a plurality of stages, and wherein the prediction component further determines, using the long short-term memory model, based on the user behavior data, a probability of that a selected stage of the plurality of stages will be reached by the user.

5. The system of claim 1, further comprising:
an output component that guides the user to the conversion objective by providing a communication to the user based on a pattern of recent user behavior defined by the user behavior data.

6. The system of claim 1, further comprising:
an output component that recommends or provides a digital medium interface to the user during use of the digital medium by the user.

7. A computer-implemented method, comprising:
training, by a system operatively coupled to a processor, using a set of training data comprising interactions of users with digital mediums, a long short-term memory model by employing at least one cross entropy loss function for a plurality of layers of the long short-term memory model to predict users next actions during the interactions with the digital mediums, and predict probabilities of conversion objectives being achieved with the users, and
training, by the system, the predicted users next actions, a Hidden Markov model to classify positions of the users along defined paths to the conversion objectives;
obtaining, by the system, user behavior data from a digital medium, the user behavior data defining an interaction of a user with the digital medium;
determining, by the system, using the long short-term memory model, based on the user behavior data, a predicted next action of the user within the digital medium; and
classifying, by the system, using the Hidden Markov model, based on the user behavior data and the predicted next action, a position of the user along a defined path to a conversion objective of the digital medium.

8. The computer-implemented method of claim 7, wherein the conversion objective comprises obtaining the user as a customer, achieving a financial transaction, or presentation of a communication.

9. The computer-implemented method of claim 7, further comprising:
determining, by the system, using the long short-term memory model, based on the user behavior data, a probability of that the conversion objective will be achieved with the user.

10. The computer-implemented method of claim 7, wherein the defined path comprises a plurality of stages, and wherein the computer-implemented method further comprises determining, by the system, using the long short-term memory model, based on the user behavior data, a probability of that a selected stage of the plurality of stages will be reached by the user.

11. The computer-implemented method of claim 7, further comprising:
guiding, by the system, the user to the conversion objective by providing a communication to the user based on a pattern of recent user behavior defined by the user behavior data.

12. A computer program product facilitating a process to guide a user at a digital medium, the computer program product comprising a non-transitory computer readable storage medium having program instructions embodied therewith, the program instructions executable by a processor to cause the processor to:
train, by the processor, using a set of training data comprising interactions of users with digital mediums, a long short-term memory model by employing at least one cross entropy loss function for a plurality of layers of the long short-term memory model to predict users next actions during the interactions with the digital mediums, and predict probabilities of conversion objectives being achieved with the users, and
train, by the processor, using the predicted users next actions, a Hidden Markov model to classify positions of the users along defined paths to the conversion objectives;
obtain, by the processor, user behavior data from the digital medium, the user behavior data defining an interaction of the user with the digital medium;
determine, by the processor, using the long short-term memory model, based on the user behavior data, a predicted next action of the user within the digital medium; and
classify, by the processor, using the Hidden Markov model, based on the user behavior data and the predicted next action, a position of the user along a defined path to a conversion objective of the digital medium.

13. The computer program product of claim 12, wherein the conversion objective comprises obtaining the user as a customer, achieving a financial transaction, or presentation of a communication.

14. The computer program product of claim 12, wherein the program instructions are further executable by the processor to cause the processor to:
determine, by the processor, using the long short-term memory model, based on the user behavior data, a probability of that the conversion objective will be achieved with the user.

15. The computer program product of claim 12, wherein the defined path comprises a plurality of stages, and
wherein the program instructions are further executable by the processor to cause the processor to determine, by the processor, using the long short-term memory model, based on the user behavior data, a probability of that a selected stage of the plurality of stages will be reached by the user.

16. The computer program product of claim 12, wherein the program instructions are further executable by the processor to cause the processor to:
recommend or provide, by the processor, a communication or digital medium interface to the user during use of the digital medium by the user.

17. The computer program product of claim 12, wherein the long short-term memory model comprises a first layer that employs pages of the digital medium as input, and a second layer associated with times of the interactions as input.

18. The system of claim 1, wherein the long short-term memory model comprises a first layer that employs pages of the digital medium as input, and a second layer associated with times of the interactions as input.

19. The system of claim 18, wherein the long short-term memory model comprises concatenate layer that combines a first output of the first layer with a second output of the second layer.

20. The computer-implemented method of claim 7, wherein the long short-term memory model comprises a first layer that employs pages of the digital medium as input, and a second layer associated with times of the interactions as input.

* * * * *